United States Patent [19]

Yamaguchi et al.

[11] Patent Number: 4,516,650

[45] Date of Patent: May 14, 1985

[54] VEHICLE BODY STRUCTURE FOR PREVENTING WATER SUCTION INTO AN AIR CLEANER

[75] Inventors: Hitohisa Yamaguchi; Kenichiro Fuse, both of Toyota; Takeshi Yoshida, Nagoya, all of Japan

[73] Assignee: Toyota Jidosha Kabushiki Kaisha, Japan

[21] Appl. No.: 504,822

[22] Filed: Jun. 16, 1983

[30] Foreign Application Priority Data

Sep. 15, 1982 [JP] Japan ............................ 57-139351[U]

[51] Int. Cl.³ ............................................ B60K 13/02
[52] U.S. Cl. .................................. 180/68.3; 180/68.4
[58] Field of Search ................... 180/68.1, 68.2, 68.3, 180/68.4, 68.6, 69.25, 69.2; 98/2.17

[56] References Cited

U.S. PATENT DOCUMENTS

| | | | |
|---|---|---|---|
| 2,197,503 | 4/1940 | Martin | 180/68.3 X |
| 2,299,157 | 10/1942 | Lowther | 180/68.3 |
| 2,383,029 | 8/1945 | Ulrich | 180/69.2 X |
| 2,684,204 | 7/1954 | Lamb | 180/68.3 |
| 4,114,714 | 9/1978 | Fachbach et al. | 180/68.1 |
| 4,164,262 | 8/1979 | Skatsche et al. | 180/68.1 |

Primary Examiner—Joseph F. Peters, Jr.
Assistant Examiner—Mark C. Dukes
Attorney, Agent, or Firm—Parkhurst & Oliff

[57] ABSTRACT

A vehicle body structure for preventing suction of water into the vehicle's air cleaner. A suction duct connected to the air cleaner extends forwardly in the vehicle to an opening in a radiator support panel for introducing cold outside air. A return passage also having an opening at its forward end and in the same support panel is provided just under the suction duct opening in that panel.

17 Claims, 2 Drawing Figures

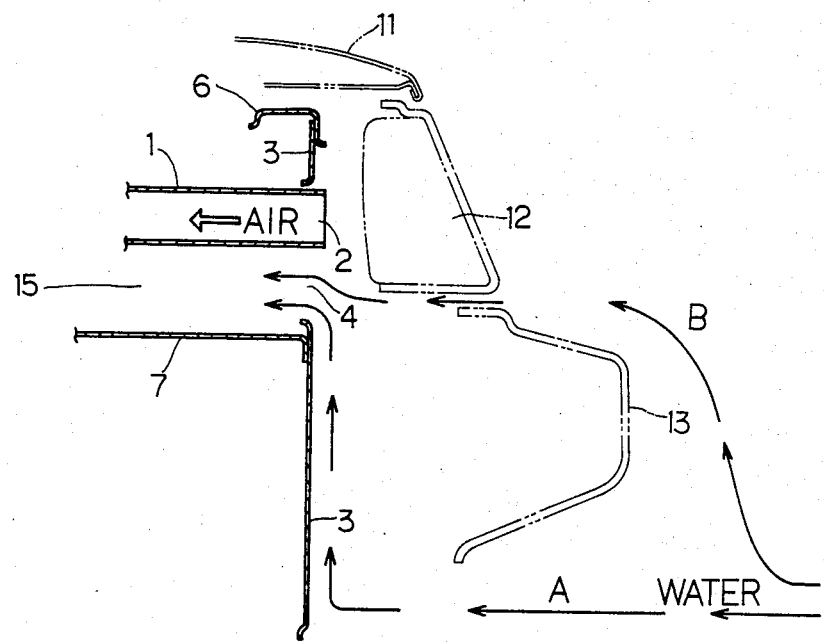

VEHICLE BODY STRUCTURE FOR PREVENTING WATER SUCTION INTO AN AIR CLEANER

BACKGROUND OF THE INVENTION

The present invention relates to a vehicle body structure associated with an air cleaner for supplying clean air to an engine, and more particularly to a system which prevents suction of water into the air cleaner.

When running a vehicle on roads covered or submerged with water due to flooding, the surface water may enter the vehicle. When the surface of the flood water reaches a lower portion of a radiator support panel installed in a forward portion of the vehicle, that water may rise along the radiator support panel. At the upper portion of the radiator support panel there is an opening of a suction duct for providing relatively cold air into the vehicle's engine to achieve greater engine power than that of an engine which is not provided with such cold air. Flood water may be suctioned into the opening of the suction duct. This causes the water to be suctioned with air into the air cleaner by the vacuum created in the engine, and such suctioned water impairs performance of the air cleaner and the engine.

As a previous attempt to solve such problems, there is known a vehicle body structure wherein the forward end of the suction duct is located in front of the radiator support panel thereby preventing water suction into the air cleaner.

As a headlight and other parts are installed in front of the forward end of the suction duct, the space should be provided between the headlight and the forward end of the suction duct. But, the distance between the forward end of the suction duct and the radiator support panel is typically not sufficient to prevent water suction. In such structures water rises along the radiator support panel to be suctioned into the air cleaner by the vacuum created in the engine. This still adversely affects the performances of the air cleaner and the engine.

SUMMARY OF THE INVENTION

The present invention was made in view of the foregoing background and to overcome the foregoing drawbacks. It is accordingly an object of this invention to provide a vehicle body structure for preventing suction of water into the air cleaner.

To obtain the above objects, a device according to the present invention comprises a vehicle having:
  an air cleaner for introducing outside air;
  a body member extending laterally across the vehicle;
  an air cleaner duct connected to the air cleaner at one of its ends and extending to the body member at the other end for permitting air flow therethrough, with the body member including a hole just below the position of the other end of the air cleaner duct whereby water rising along the body member is expelled through the hole and the passage behind that hole.

BRIEF DESCRIPTION OF THE DRAWINGS

The above objects, features and advantages of the present invention will become more apparent from reading the following description of the preferred embodiments taken in conjunction with the accompanying drawings, wherein:

FIG. 2 is a cross-sectional view taken along line II—II of FIG. 1.

DETAILED DESCRIPTION OF THE PREFERRED EMBODIMENTS

Figure 1:
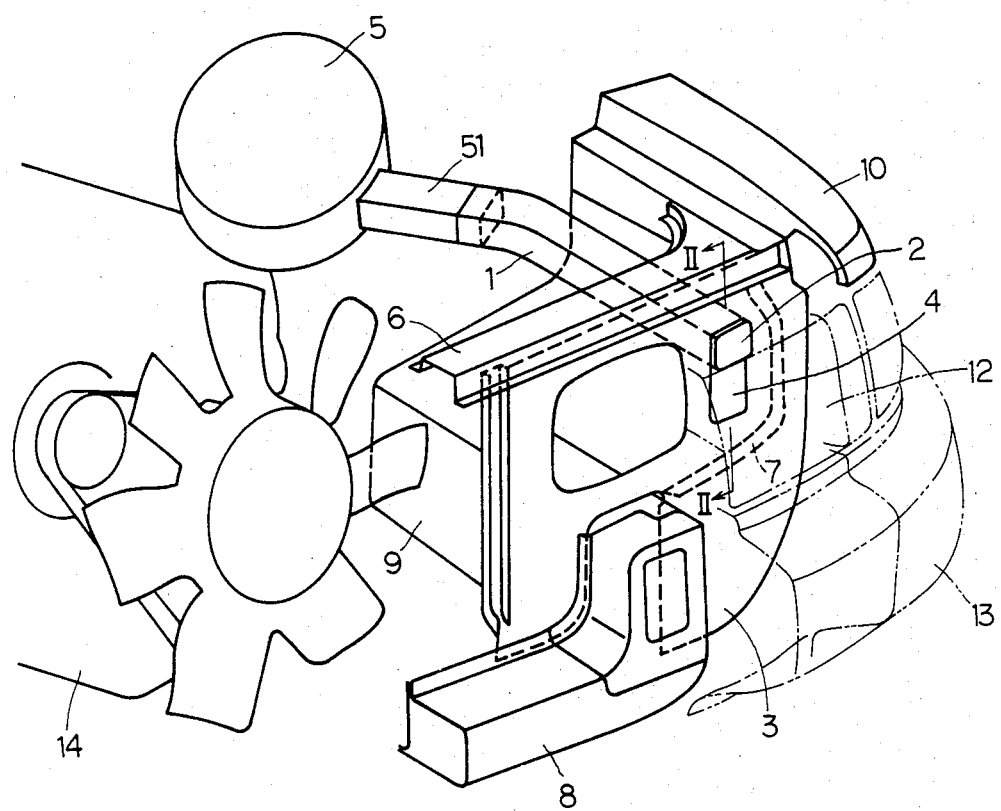
FIG. 1 is a perspective view of a left, front corner of a vehicle, embodying the present invention.

The present invention will be described in detail with reference to the accompanying drawings which illustrate different embodiments of the present invention.

Referring first to FIG. 1, there is shown a perspective view of a left, front portion of a vehicle body structure for preventing water suction according to the present invention.

Air is introduced into an air cleaner 5 and the clean air is suctioned into an engine 14 of a vehicle by the vacuum created in the engine, with gasoline fuel separately supplied by a carburetor or fuel injection system (not shown in the drawings).

In order to achieve greater engine power than that of an engine which is not provided with cold air, cold air must be provided. The atmospheric temperature in the engine compartment is, due to engine heat, relatively high compared with that around the forward part of the vehicle. To supply cold air into the air cleaner 5, a suction duct 1 is connected to an air cleaner nose 51 at one end and extends forward in the vehicle to a radiator support panel 3 at the other end 2. The radiator support panel 3 is located laterally across the vehicle for supporting a radiator (not shown in the drawings). At the upper end of the radiator support panel 3, an upper radiator support panel 6 is secured to the radiator support panel 3. A the rear side of the radiator support panel 3, an apron panel 7 is secured to the radiator support panel 3. A side member 9 extends longitudinally in the vehicle and is fastened at its forward end to a cross member 8 which extends laterally across the vehicle. The lower end of the radiator support panel 3 is also fastened to the cross member 8. Upper radiator support panel 6 is connected at its lateral ends to a fender panel 10.

Referring next to FIG. 2, there is illustrated a cross-sectional view taken along line II—II of FIG. 1.

Above the upper radiator support panel 6, an engine hood 11 is pivotally mounted for permitting engine maintenance. In front of the upper portion of the radiator support panel 3 and the forward end 2 of the suction duct 1, headlight 12 is located and secured to the vehicle body. A front bumper 13 is provided under headlight 12 and in front of the lower portion of radiator support panel 3. Further, an opening 4 is provided at the upper portion of the radiator support panel 3, adjacent to and just below suction duct 1. As shown in FIG. 1, the opening 4 is at least as wide as the forward end 2 of the suction duct 1. Additionally, FIG. 1 shows that the opening 4 and the forward end 2 are located at a position which is transversely offset from a side portion of a radiator, upon appropriate installation of the radiator. The rearward end of the passage 15 is opened and freely communicates with the ground below the vehicle.

When a driver drives a vehicle on a road covered with or submerged in flood water, the water rises and may flow into the inside of the vehicle as indicated by the arrows in FIG. 2. The water may flow into the inside of the vehicle via two routes, A and B, as indicated in FIG. 2. By route A, water rises along the radiator support panel 3 and flows into the passage 15 through opening 4 without reaching the suction duct. Such water in passage 15 finally returns to the ground through the rear opening of passage 15.

Further, by route B, water flows into a space between the bottom face of headlight 12 and the top face of front bumper 13, and then into the passage 15 through opening 4. The water which flows into passage 15 returns to the ground as in route A.

As is apparent from the above description, water does not flow into the passage of the suction duct, when the structure of the present invention is used.

Moreover, the forward end 2 of suction duct 1 is located in front of the radiator support panel 3. This layout is preferable to prevent water suction along the radiator support panel 3 into air cleaner 5.

While the present invention has been described in its preferred embodiments, it is to be understood that the invention is not limited thereto, and may be otherwise embodied within the scope of the following claims.

What is claimed is:

1. A vehicle body structure for preventing suction of exterior water into an air cleaner installed in the vehicle, comprising:
   an air cleaner for introducing outside air into an engine;
   a radiator support panel extending laterally across the vehicle;
   an air cleaner duct connected to the air cleaner at one of its ends and extending to the radiator support panel at its other end for permitting air to flow through said air cleaner duct; and
   said radiator support panel including a longitudinally extending passage having an open forward end and an open rearward end, said open forward end being located adjacent to and just below said other end of said air cleaner duct and said open rearward end communicates with a road surface which the vehicle traverses, whereby water rising along the radiator support panel enters the open forward end of said longitudinally extending passage and is returned to the road surface by passing through said passage and out said open rearward end thereof.

2. The vehicle body structure of claim 1, wherein said other end of said air cleaner duct is located longitudinally forward of said radiator support panel in the vehicle.

3. The vehicle body structure of claim 1, wherein said other end of said air cleaner duct is located in substantially the same transverse plane as that of said radiator support panel in the vehicle.

4. The vehicle body structure of claim 1, wherein said vehicle includes a front bumper member having an upper portion and a lower portion and said open forward end of said longitudinally extending passage is located vertically above said lower portion of the front bumper member.

5. The vehicle body structure of claim 1, wherein at least one other portion of the vehicle body structure is located directly forward of said open forward end of the longitudinally extending passage.

6. The vehicle body structure of claim 1, wherein said open forward end of the longitudinally extending passage is at least as wide as said other end of the air cleaner duct.

7. A vehicle body structure for preventing suction of exterior water into an air cleaner installed in the vehicle, comprising:
   an air cleaner for introducing outside air into an engine;
   a radiator support panel extending laterally across the vehicle;
   an air cleaner duct connected to the air cleaner at one of its ends and extending to the radiator support panel at its other end for permitting air to flow through said air cleaner duct; and
   said radiator support panel including a longitudinally extending passage having an open forward end and an open rearward end, said open forward end being located adjacent and just below said other end of said air cleaner duct, said open forward end of the longitudinally extending passage being at least as wide as said other end of the air cleaner duct and said open rearward end communicates with a road surface which the vehicle traverses, whereby water rising along the radiator support panel enters the open forward end of said longitudinally extending passage and is returned to the road surface by passing through said passage and out said open rearward end thereof.

8. The vehicle body structure of claim 7, wherein said other end of said air cleaner duct is located longitudinally forward of said radiator support panel in the vehicle.

9. The vehicle body structure of claim 7, wherein said other end of said air cleaner duct is located in substantially the same transverse plane as that of said radiator support panel in the vehicle.

10. The vehicle body structure of claim 7, wherein said vehicle includes a front bumper member having an upper portion and a lower portion and said open forward end of said longitudinally extending passage is located vertically above said lower portion of the front bumper member.

11. The vehicle body structure of claim 7, wherein at least one other portion of the vehicle body structure is located directly forward of said open forward end of the longitudinally extending passage.

12. A vehicle body structure for preventing suction of exterior water into an air cleaner installed in the vehicle, comprising:
   an air cleaner for introducing air into an engine;
   a radiator support panel extending laterally across the vehicle;
   a radiator attached to said radiator support panel;
   an air cleaner duct connected to the air cleaner at one of its ends and extending to the radiator support panel at its other end for permitting air to flow through said air cleaner duct; and
   said radiator support panel including a longitudinally extending passage having an open forward end and an open rearward end, said open forward end being located adjacent to and just below said other end of the air cleaner duct and said open rearward end communicates with a road surface which the vehicle traverses, said other end of the air cleaner duct and said open forward end of the longitudinally extending passage being offset from a side of said radiator, whereby water rising along the radiator support panel enters the open forward end of said longitudinally extending passage and is returned to the road surface by passing through said passage and out said open rearward end.

13. The vehicle body structure of claim 12, wherein said other end of said air cleaner duct is located longitudinally forward of said radiator support panel in the vehicle.

14. The vehicle body structure of claim 12, wherein said other end of said air cleaner duct is located in substantially the same transverse plane as that of said radiator support panel in the vehicle.

15. The vehicle body structure of claim 12, wherein said vehicle includes a front bumper member having an upper portion and a lower portion and said open forward end of said longitudinally extending passage is located vertically above said lower portion of the front bumper member.

16. The vehicle body structure of claim 12, wherein at least one other portion of the vehicle body structure is located directly forward of said open forward end of the longitudinally extending passage.

17. The vehicle body structure of claim 12, wherein said open forward end of the longitudinally extending passage is at least as wide as said other end of the air cleaner duct.

* * * * *